Nov. 16, 1937.　　　W. L. WALKER　　　2,099,153
GAUGER'S TAPE REEL
Filed July 17, 1936
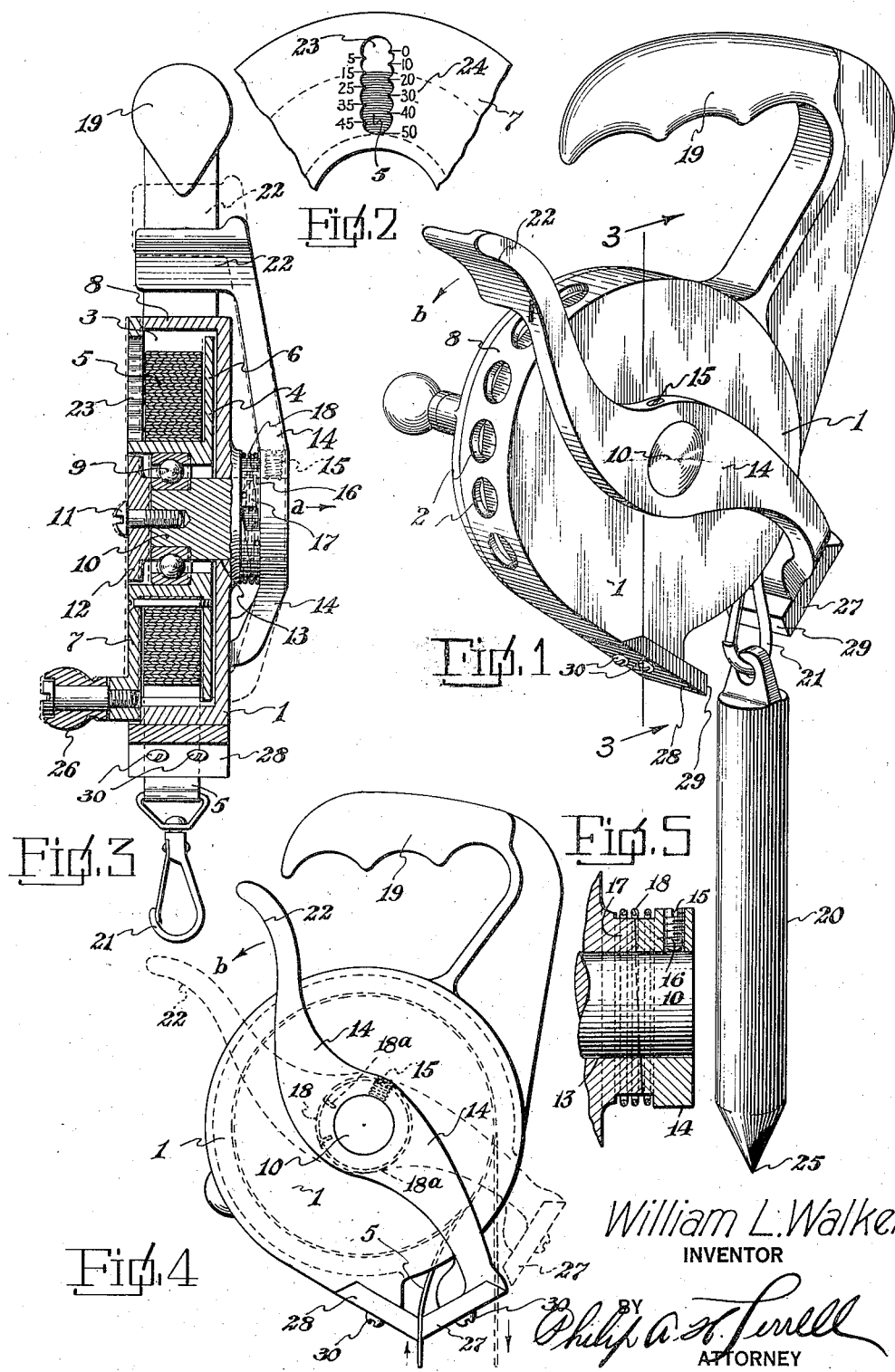
William L. Walker
INVENTOR Patented Nov. 16, 1937

2,099,153

UNITED STATES PATENT OFFICE 2,099,153

GAUGER'S TAPE REEL

William L. Walker, Tulsa, Okla.

Application July 17, 1936, Serial No. 91,210

7 Claims. (Cl. 242—84.8)

The invention relates to gaugers' tape reels of the character used for lowering, under the influence of a plumb bob or weight, into a theft hole or pipe of an oil tank for measuring the liquid level within the tank, and to provide wiper means for wiping the surfaces of the tape after the reading operation, thereby removing oil or other substance from the tape during the rewinding operation and maintaining the tape body and works free from oil.

A further object is to provide a hand grip member at the upper sides of the tape body, thereby allowing the tape reel as a whole to be easily handled and the weight thereof to be suspended from the hand.

A further object is to provide a pivoted lever carried by the tape casing and having a finger engaging member adjacent the handle member and a wiping element at its lower end cooperating with a fixed wiper member carried by the casing and between which the tape passes.

A further object is to provide a clutch means controlled by the pivoted lever and constructed in a manner whereby upon initial movement of the lever the reel will be released thereby allowing the unwinding of the tape and upon release the reel held against rotation, for instance when the weight reaches the bottom of the tank.

A further object is to provide wiping elements wider than the tape and formed from yieldable material whereby when compressed against the tape, during the wiping operation, the edges of the tape will also be wiped. Also to construct the wiper elements so they can be reversed when they were out of shape.

A further object is to provide a sight opening in the reel flange through which the operator may view the sides of the tape convolutions and estimate the approximate amount of tape unreeled, thereby estimating when to operate the clutch for stopping operation as the weight member approaches the limit of its downward movement.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:

Figure 1 is a perspective view of the gaugers' tape reel, showing the same in position for use.

Figure 2 is a detail side view of a portion of the reel flange showing the sight opening and indicia thereon.

Figure 3 is a vertical transverse sectional view through the device.

Figure 4 is a side elevation of the reel casing showing the wiping elements in operating position against the tape after the measuring operation and during the reeling operation.

Figure 5 is a vertical longitudinal sectional view through the clutch, showing a portion of the casing.

Referring to the drawing, the numeral 1 designates the casing of the gaugers' tape reel and which casing is provided with apertures 2 for allowing drainage therefrom of any oil or fluid which may get in the device. The device is particularly adapted for measuring the liquid level within oil storage tanks through theft holes therein and will be so described. It is obvious the device may be used for measuring any kind of material, from which it will be necessary to wipe the material from the tape during the rewinding operation.

Rotatably mounted within the chamber 3 of the casing 1 is a reel 4, on which is wound a conventional form of steel tape 5. The reel 4 has an inner flange 6 and an outer flange 7. It will be seen that the outer flange 7 overlies the outer side or edge of the casing flange 8, and during the clutching operation, hereinafter set forth, cooperates with the flange 8 for holding the reel 4 against rotation. Other clutch means may be used if so desired, for instance the reel 6 may clutch in the bottom of the casing chamber. The reel 4 is mounted on an antifrictional bearing 9, carried by the stud shaft 10, which is axially movable in the casing 1 for moving the reel as a whole in the direction of the arrow $a$ for a clutching operation, or in a reverse direction for declutching operation. Secured to the end of the stub shaft 10 by means of a screw 11 is a plate 12 which clamps the antifrictional bearing 9 to the stub shaft so that the reel will axially move with the movement of the stub shaft. This movement is shown in dotted lines in Figure 3. The reel and stud shaft, during their axial movement, are guided by the bearing 13 carried by the casing 1, and in which the stub shaft 10 is slidably mounted, and on which stub shaft is mounted the control lever 14 which is anchored thereto by means of a set screw 15.

The stub shaft 10 is axially moved in the direction of the arrow $a$ for the reel clutching and stopping operation by cooperating spiral cams 16 and 17 carried respectively by the control lever 14 and the adjacent wall of the reel casing 1. It will be noted that surrounding these cams is a torsional spring 18 anchored to the control lever 14 and to the casing 1 at 18a, therefore it will be seen that the lever is normally forced in the direction of the arrow b of Figure 1 and the reel flange 7 is held in clutched engagement with the casing flange 8, thereby preventing rotation of the reel. Extending upwardly and inwardly above the casing 1 is a handle member 19, adapted to be grasped by the operator for suspending the device above the theft hole of a tank. It will be noted that by providing the handle member in this position, the heavy gaugers' tape reel as a whole may be easily supported without the strain on the wrist of the operator as is now the main objection where the handle projects outwardly from the side of the casing. When the lever 14 is in the position shown in Figure 1, the coiled torsional spring 18, in combination with the cooperating spiral cams 16 and 17, holds the reel in clutched position and against unwinding. The operator then lowers the weight 20 into the theft hole of the tank, and which weight is connected by a snap hook 21 to the tape line 5.

With the device above the theft hole as above set forth, the operator places one of his fingers over the finger engaging end 22 of the lever 14 and forces the same slightly towards the handle member 19. This initial movement releases the clutching action on the reel and allows the reel to unwind under the influence of the weight 20. Lever 14 is only slightly moved for this operation and is held in this position until the operator notices the amount of unwinding of the tape 5 through sight opening 23.

The operator knows substantially the total depth of the tank and as the tape unwinds until it approaches approximately the depth indicated by the indicia scale 24, he releases his finger from the lever, thereby allowing the torsion spring 18 and the cooperating cams 16 and 17 to again clutch and hold the reel. The operator can then manipulate the device so that by feel, he can tell when the point 25 of the weight engages the bottom of the tank. When the operator ascertains that the point 25 is on the bottom of tank, or into heavy substance on the bottom, such as bottom settling or sand, he then grasps the handle member 26 with his right hand, and at the same time puts his left hand index finger over the finger engaging portion 22 of the lever 14 and starts the reeling operation. When the tape is raised sufficient to show the wet portion thereof and a reading is taken as to the wet line, the operator moves the finger engaging lever to an extreme inner position, thereby bringing the rubber tape cleaning member 27 into engagement with one side of the tape as shown in Figure 4 and forces the same against the rubber tape cleaning member 28 carried by the casing 1. It will be noted in Figure 3 that the rubber cleaning elements 27 and 28 are wider than the tape 5, therefore the tape will imbed itself in the adjacent bevelled ends 29 of the wiper members, consequently the side edges, as well as the faces of the tape will be wiped and the oil or other liquid will flow downwardly into the theft opening of the tank during the continued reeling operation, and the oil will not be carried into the casing of the device. The wiper members 27 and 28 are bevelled at both ends, thereby allowing the same to be reversed in case of excessive wear.

The wiper members 27 and 28 are held in position by means of screws 30, therefore it will be seen that they may be easily renewed or reversed.

By providing a tape and tape reel as above set forth, it will be seen that the device may be manipulated so that the weight will enter the bottom settlings or sand in a vertical position so that only the point will reach the bottom of the tank. There is a decided advantage in this as the weight will not become stuck, which often happens if allowed to lie flat in the bottom settlings and the tape will often break or the connection to the weight in trying to dislodge the imbedded weight from the bottom settlings. The vertical movement of the weight obviates this disadvantage. Referring to Figure 1, it will be seen that the swivel hook may be positioned substantially within the reel casing so that it will be engaged by the tape wiper elements and the weight will be suspended from the wiper elements, thereby relieving the weight strain on the tape when the device is not in use, and the tape will not become bent nor break incident to a bending operation in one place. The hook becomes rigid when it is drawn into engagement with the casing.

From the above it will be seen that a gaugers' tape reel is provided which may be easily held in position above a theft opening of a tank, incident to the handle being on the upper side of the device, rather than on the side thereof, and the pivoted lever 14 controls the clutch means on the initial movements thereof, and on the extreme movement thereof, the wiper elements are brought into cooperative cleaning relation with opposite sides of the tape.

The invention having been set forth what is claimed as new and useful is:

1. The combination with a gaugers' tape reel disposed within a casing and having a tape therein and from which the tape is fed, a handle member for the casing, a clutch means for controlling the feeding of the tape, wiper means for wiping the tape, of a single lever for simultaneously controlling the operation of both the clutch means and the wiper means.

2. The combination with a gaugers' tape reel from which a tape is fed by gravity means, of clutch means for stopping and starting the unwinding operation, lever means for controlling said clutch means, and wiper means controlled by the lever means whereby when the clutch means is declutched said wiper means will be moved to wiping position.

3. A gaugers' tape reel comprising a casing, a handle member carried by said casing in upward spaced relation to the upper side thereof, a reel within the casing, a tape on the reel, one flange of the reel overlying one side of the casing thereby forming cooperating clutch surfaces, a stub shaft extending through the reel and on which the reel is rotatably mounted, a rock lever carried by the stub shaft, cam surfaces carried by the rock lever and the casing and forming means for moving the stub shaft axially upon rocking of the lever for a clutching or declutching operation, spring means cooperating with the lever and casing for normally maintaining the device clutched, said lever means being within reach of the hand of the operator for grasping the handle means.

4. A device as set forth in claim 3 including wiper means carried by the casing and the lever and adapted to be moved into cooperative engagement with the tape following a declutching operation.

5. The combination with a gaugers' tape reel, a casing within which the tape is disposed, a tape on said reel and passing through an opening in the casing in the under side thereof, a handle member carried by the casing and above the upper end thereof, a spring actuated normally closed clutch for holding the tape against unreeling, a lever controlling said clutch and within reach of the finger of the operator gripping the handle member, a tape wiper means carried by the casing, a tape wiper member carried by the lever, said tape wiper member being thrown into cooperative engagement with opposite sides of the tape simultaneously with a declutching operation.

6. The combination with a gaugers' tape reel, a casing within which the tape is disposed, a tape in said reel and passing through an opening in the casing in the under side thereof, a handle member carried by the casing above the upper end thereof and opposite the said casing opening, a spring actuated normally closed clutch for holding the tape against unreeling, a lever controlling said clutch and within reach of the finger of the operator gripping the handle member, yieldable wiper members carried by the lever and the casing and movable into sliding engagement with the tape upon rocking of the lever and simultaneous clutch releasing, said wipers being formed from yieldable material and being wider than the tape, whereby the edges of the tape will be wiped as the tape is imbedded in the wiper members.

7. The combination with a gaugers' tape reel, a casing within which the tape is disposed, a tape in said reel and passing through an opening in the casing in the under side thereof, a handle member carried by the casing above the upper end thereof and opposite the said casing opening, a spring actuated normally closed clutch for holding the tape against unreeling, a lever controlling said clutch and within reach of the finger of the operator gripping the handle member, cooperating tape wiper members carried by the casing and the pivoted lever, said cooperating wiper members having bevelled ends at both ends thereof, and means whereby said wiper members may be turned end for end.

WILLIAM L. WALKER.